United States Patent
Luangrath et al.

(10) Patent No.: US 12,046,943 B2
(45) Date of Patent: Jul. 23, 2024

(54) STACKABLE BATTERY CHARGING AND POWER OUTPUT SLICES

(71) Applicant: Inergy Holdings, LLC, Chubbuck, ID (US)

(72) Inventors: Sean Luangrath, Highland, UT (US); Zachary Blume, Orem, UT (US)

(73) Assignee: Inergy Holdings, LLC, Chubbuck, ID (US)

( * ) Notice: Subject to any disclaimer, the term of this patent is extended or adjusted under 35 U.S.C. 154(b) by 306 days.

(21) Appl. No.: 17/337,402

(22) Filed: Jun. 2, 2021

(65) Prior Publication Data

US 2021/0376635 A1    Dec. 2, 2021

Related U.S. Application Data

(60) Provisional application No. 63/033,646, filed on Jun. 2, 2020.

(51) Int. Cl.
| | |
|---|---|
| *H02J 7/00* | (2006.01) |
| *H01R 33/945* | (2006.01) |
| *H02J 7/35* | (2006.01) |
| *H01R 13/627* | (2006.01) |
| *H01R 13/629* | (2006.01) |

(52) U.S. Cl.
CPC .............. *H02J 7/35* (2013.01); *H01R 33/945* (2013.01); *H02J 7/00032* (2020.01); *H02J 7/0045* (2013.01); *H02J 7/0048* (2020.01); *H02J 7/007182* (2020.01); *H01R 13/6275* (2013.01); *H01R 13/629* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 2004/0130953 A1* | 7/2004 | Ambroggi | G11C 29/789 365/200 |
| 2017/0229902 A1* | 8/2017 | Kamikawa | H01M 10/441 |
| 2018/0375349 A1* | 12/2018 | Bonilla | H02J 50/80 |

* cited by examiner

*Primary Examiner* — Arun C Williams
(74) *Attorney, Agent, or Firm* — Kunzler Bean & Adamson

(57) ABSTRACT

Apparatuses, systems, and methods are disclosed for battery charging and power output. A system may include a plurality of hot-swappable, stackable slices for battery charging and power output. A slice may include communication circuitry for communication among the slices. A slice may include power input conversion circuitry, power storage circuitry, and/or power output conversion circuitry. A slice may include at least one electrical connector for connecting to a second slice. The at least one electrical connector may include connections for power and communications. A slice may include at least one mechanical connector for connecting to the second slice.

20 Claims, 13 Drawing Sheets

STACKABLE BATTERY CHARGING AND POWER OUTPUT SLICES

CROSS-REFERENCES TO RELATED APPLICATIONS

This application claims the benefit of U.S. Provisional Patent Application No. 63/033,646 entitled "MOBILE PHONE CHARGING SYSTEM" and filed on Jun. 2, 2020 for Sean Luangrath, which is incorporated herein by reference.

FIELD

This invention relates to battery charging and more particularly relates to stackable battery charging and power output slices.

BACKGROUND

More than 1.1 billion people lack access to electricity. This fraction of the global population is off-grid and is referred to as the base of the socioeconomic pyramid. The "base of the pyramid" includes more than 4 billion people that spend up to 30% of household income on expensive batteries and low-quality, dangerous fuel-based sources of light, such as kerosene, to meet their energy needs. Families in these households inhale toxic kerosene fumes on a nightly basis. Moreover, children struggle to study because they rely on using dim kerosene light.

Various systems exist for off-grid power generation using solar panel arrays, wind turbines, or the like to charge storage batteries. However, installing a system with sufficient power generation and energy storage capacity to fully meet a household's energy needs, provide room to grow, or provide power outside the household to neighbors may be cost-prohibitive. Conversely, installing a small system may reduce initial costs but "lock" the users into a system that does not fully meet their needs and that is impractical to expand.

SUMMARY

Systems are disclosed for battery charging and power output. A system, in one embodiment, includes a plurality of hot-swappable, stackable slices for battery charging and power output. In some embodiments, a slice includes communication circuitry for communication among the slices. In some embodiments, a slice includes power input conversion circuitry, power storage circuitry, and/or power output conversion circuitry. In some embodiments, a slice includes at least one electrical connector for connecting to a second slice. The at least one electrical connector may include connections for power and communications. In some embodiment, a slice includes at least one mechanical connector for connecting to the second slice.

In some embodiments, an electrical connector includes an upper electrical connector located on an upper surface of the slice, and/or a lower electrical connector located on a lower surface of the slice. In some embodiments, a mechanical connector includes one or more alignment features to align the slice with the second slice, and a sliding latch operable to detachably connect the slice to the second slice. In some embodiments, at least one electrical connector and at least one mechanical connector are disposed on a lower surface of the slice, corresponding to at least one electrical connector and at least one mechanical connector on an upper surface of the second slice, such that stacking the slice on the second slice forms an electrical and mechanical connection between the slice and the second slice.

In some embodiments, an electrical connector includes conductors for a positive rail common to the plurality of slices, a ground rail common to the plurality of slices, and a communication bus for communication among the slices. In some embodiments, the communication circuitry is configured to claim a dynamically assigned address for the slice, based on a unique identifier for the slice and previously assigned addresses for the plurality of slices. In some embodiments, the communication circuitry is configured to broadcast an ID for the slice that includes a dynamically assigned address for the slice and a slice type for the slice.

In some embodiments, one of the slices is a storage slice that includes a battery and battery management circuitry. In some embodiments, battery management circuitry includes a primary battery management system that shuts off when a battery voltage is below a threshold, and a secondary battery management system that operates when the battery voltage is below the threshold.

In some embodiments, at least one of the slices is an AC output slice that includes DC-to-AC power output conversion circuitry and a plurality of AC power outlets. In some embodiments, at least one of the slices is a DC output slice that includes DC-to-DC power output conversion circuitry and a plurality of DC power outlets. In some embodiments, at least one of the slices is a DC input slice that includes at least one DC power input connection for connecting to a DC power source, and DC-to-DC power input conversion circuitry. In some embodiments, a DC input slice includes a plurality of DC power input connections, and the DC-to-DC power input conversion circuitry includes a plurality of DC-to-DC power converters coupled to the DC power input connections. In some embodiments, at least one of the slices is an AC input slice that includes at least one AC power input connection, and AC-to-DC power input conversion circuitry.

In some embodiments, at least one of the slices includes a display for presenting information to a user about the plurality of slices. In some embodiments, a system includes a stack base that includes a first electrical connector located on an upper surface of the stack base for connecting to a first stack of slices, and a second electrical connector coupled to the first electrical connector by a cable, for connecting to a second stack of slices.

Apparatuses are disclosed for battery charging and power output. In some embodiments, and apparatus includes a hot-swappable, stackable slice for battery charging and power output. In some embodiments, the slice includes communication circuitry for communication with one or more other slices. In some embodiments, the slice includes power input conversion circuitry, power storage circuitry, and/or power output conversion circuitry. In some embodiments, the slice includes at least one electrical connector for connecting to a second slice. An electrical connector may include connections for power and communications. In some embodiments, the slice includes at least one mechanical connector for connecting to the second slice.

In some embodiments, an electrical connector includes an upper electrical connector located on an upper surface of the slice, and/or a lower electrical connector located on a lower surface of the slice. In some embodiments, a mechanical connector includes one or more alignment features to align the slice with the second slice. In some embodiments, a mechanical connector includes a sliding latch operable to detachably connect the slice to the second slice.

Methods are disclosed for battery charging and power output. A method, in some embodiments, includes providing a plurality of hot-swappable, stackable slices for battery charging and power output. A slice may include communication circuitry for communication among the slices; power input conversion circuitry, power storage circuitry, and/or power output conversion circuitry; at least one electrical connector for connecting to a second slice, including connections for power and communications; and at least one mechanical connector for connecting to the second slice. A method, in some embodiments, includes mechanically and electrically coupling the slices to form a stack. A method, in some embodiments, includes operating the slices for battery charging and power output. A method, in some embodiments, includes, at a subsequent time, adding an additional slice to the stack to expand one or more of input capacity, storage capacity, and output capacity for the stack.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
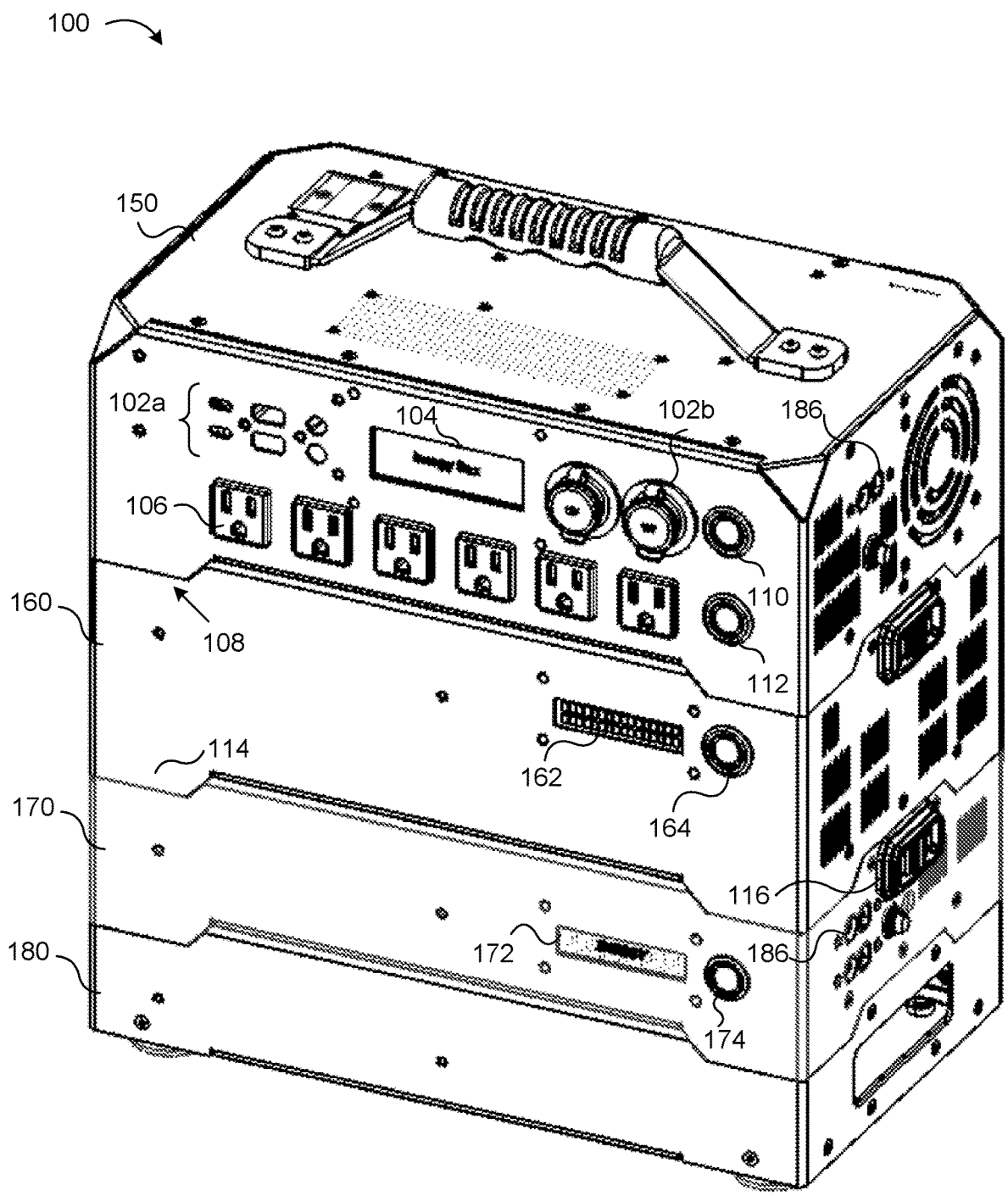
FIG. 1 is a perspective view illustrating one embodiment of a system for battery charging and power output.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an electrically erasable programmable read-only memory ("EEPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain examples, may alternatively be embodied by or implemented as a component.

A circuit, or circuitry, as used herein, comprises a set of one or more electrical and/or electronic components providing one or more pathways for electrical current. In certain examples, circuitry may include a return pathway for electrical current, so that a circuit is a closed loop. In some examples, however, a set of components that does not include a return pathway for electrical current may be referred to as a circuit or as circuitry (e.g., an open loop). For example, an integrated circuit may be referred to as a circuit or as circuitry regardless of whether the integrated circuit is coupled to ground (as a return pathway for electrical current) or not. In various examples, circuitry may include an integrated circuit, a portion of an integrated circuit, a set of integrated circuits, a set of non-integrated electrical and/or electrical components with or without integrated circuit devices, or the like. In one or more examples, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain example, may be embodied by or implemented as a circuit.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 depicts one embodiment of a system 100 for battery charging and power output. In various embodiments, a system 100 may include a plurality of hot-swappable, stackable slices 150, 160, 170 for battery charging and power output. The slices 150, 160, 170 are described below.

The term "slice" as used herein refers to a stackable or modular apparatus that is configured to receive power into a system, store energy, and/or output power from the system. The functions and components of a system 100 may be divided among multiple slices, so that an individual slice performs some of the functions of the system 100. Thus, in various embodiments, a slice may include components for power input alone, power storage alone, power output alone, power input and storage without output from the system, power input and output without storage, power storage and output without input to the system, or combined power input, output, and storage. Slices that do not perform input functions for the system 100 may nevertheless include connections to other slices to receive power from the other slices. Similarly, slices that do not perform output functions for the system 100 nevertheless include connections to other slices to transfer power to the other slices.

In the depicted embodiment, the slices 150, 160, 170 in the system 100 are arranged vertically in a stack, and are mechanically and electrically coupled together by connectors that are described below. In the depicted embodiment, the stack is supported by a stack base 180. In another embodiment, a stack base 180 may be omitted. In some embodiments, a slice may include a stackable housing that encloses and/or provides mechanical support for other components of the slice. For example, internal components of a slice such as a battery for energy storage may be enclosed by the housing, while components with an external portion such as outlets for outputting power from the battery to other devices may be mounted in the housing. In some embodiments, stacking of slices may be facilitated by housings with a uniform "footprint" or perimeter, so that slices can be stacked without an overhang or underhang between slices. (Height, however, may vary between slices in some embodiments, or may be uniform for the slices in some embodiments). In some embodiments, stacking of slices may be facilitated by components that align or register slices in position in a stack, such as alignment pins that engage recesses, lower feet that engage matching indentations at the top of other slices, or the like. In some embodiments, stacking of slices may be facilitated by providing slice housings with strong support walls so that slices lower in a stack are not damaged by the weight of slices further up in a stack. Various other or further features of a slice housing may be suitable for making a slice stackable.

Additionally, in various embodiments, slices may be hot-swappable. Hot swappable slices, in some embodiments may be added to (or removed from) a system 100 by mechanically and electrically coupling (or decoupling) the slices without further user intervention to reconfigure the system 100. In some embodiments, rather than a user providing information about what components are present, hot-swappable slices may communicate among themselves to determine what components are present. Additionally, in some embodiments, communication among slices to perform or manage the functions of a system may be host-free or multi-master communications, so that a hot-swappable slice may initiate communications directly with another slice rather than via a host. Direct or host-free communication between slices may allow slices in a system to function in various combinations without requiring one particular host or control slice to be present. For example, a slice may be a "head unit" capable of receiving displaying information about other slices, such as state of charge for storage batteries in different slices, but a power input slice and a storage slice in a system 100 may cooperate to charge batteries in the storage slice using power received by the power input slice, even if the head unit slice is removed from the system 100 (e.g., for use in another system or as a standalone apparatus)

In the depicted embodiment, slice 150 is an alternating current ("AC") output slice, that includes AC power outlets 106. The terms "AC" and "DC" are used herein to refer to alternating current electrical power and direct current electrical power, respectively, and to signals, components, and the like associated with such currents, regardless of whether current is flowing or not. Thus, for example, a voltage that alternates in polarity may be referred to as an AC voltage despite being a voltage, not a current. Similarly, an outlet for outputting AC power may be referred to as an AC power outlet 106, even at times when no load or device is plugged in to draw current from the outlet.

In various embodiments, an AC output slice may or may not include certain non-AC or non-output components, such as DC power outlets 102, AC power inputs, DC power inputs, or the like. In the depicted embodiment, the slice 150 includes DC power outlets 102, a display 104, AC power outlets 106, power buttons 110, 112, and a DC power inlet 186. In various embodiments, a slice may omit some components of the slice 150, and/or may include other components (e.g., as described for other slices below).

DC power outlets 102, in various embodiments, may include any outlets or connectors for coupling DC power from the system 100 to an external, DC powered device. In the depicted embodiment, DC power outlets 102 include small connectors 102a, which are USB-C, USB-A and 5525 coaxial "barrel plug" connectors (with an outer diameter of 5.5 mm and an inner diameter of 2.5 mm), and larger connectors 102b, which are 12 volt "cigarette lighter" outlets. In various embodiments, a slice may include various other or further DC power outlets, such as Anderson POWERPOLE® (or compatible) connectors, terminals for spade connectors, ring connectors, banana plugs, or the like. The DC power outlets 102 may be part of or coupled to one or more hardware assemblies with other components. For example, the DC power outlets 102 may be coupled to a printed circuit board assembly with power regulation hardware to regulate voltages at different outlets, communicate with devices to negotiate power levels (e.g., to provide USB Power Delivery to laptops or other high-power devices via the USB-C ports), or the like.

A display 104, in the depicted embodiment, is provided for presenting information to a user about one or more of the slices. In some embodiments a slice may include a display for presenting information only about that slice. In the depicted embodiment, however, the slice 150 is a "head unit" configured to gather information from other slices and present it via the display 104. For example, the display 104 may include information such as a state of charge percentage for individual slices in the system 100, an aggregate state of charge percentage for the system 100, power input levels (currently or over time), power output levels (currently or over time), or the like.

AC power outlets 106, in the depicted embodiment, may include any outlets or connectors for coupling AC power from the system 100 to an external, AC powered device. In the depicted embodiment, the AC power outlets 106 are National Electrical Manufacturers Association (NEMA) 5-15R outlets for common North American electric appliances. In another embodiment, AC power outlets 106 may include another type of power outlet or various types of power outlet, such as a NEMA TT-30R receptacle to provide power to a recreational vehicle, sockets or outlets more commonly used outside North America, such as British, Australian, European, or Japanese sockets, or an "international" socket shaped to accept multiple types of plugs. The slice 150 may include an inverter or DC-to-AC power converter coupled to the AC power outlets 106 to produce AC power.

In the depicted embodiment, the slice 150 includes two power buttons 110, 112, where power button 110 turns power output via the DC power outlets 102 on and off, and power button 112 turns power output via the AC power outlets 106 on and off. In some embodiments, one of the power buttons 110, 112, may also control power to the display 104. In some embodiments, certain components of a slice may be powered up any time power is available to the slice, without being controlled by a power button. For example, communication circuitry for communicating among the slices may be kept powered up even when a power switch is used to turn a display 104 off.

In the depicted embodiment, slices 150, 160, and 170 include alignment features 108, 114 to align the slices with each other in a stack. In various embodiments, where a first slice is stackable on a second slice, alignment features may be corresponding or complementary features of the first slice and the second slice that align the slices or register them in position for stacking. For example, alignment features may include corresponding protrusions and recesses, such as alignment pins and holes. In the depicted embodiment, the alignment features include feet 114 that protrude below the body of each slice at the corners, and corresponding recesses 108 in the top corners of slices 160, 170 and the stack base 180, to receive the feet 114. In various embodiments, a slice may include one or more alignment features to align the slice with another slice, which may be in addition to or instead of the feet 114 and recesses 108 provided as alignment features in the depicted embodiment.

In the depicted embodiment, recesses 108 are omitted from the "head unit" slice 150 at the top of the stack. A head unit may omit other components of mid-stack slices such as electrical connectors on a top surface, and may include other components for the top of a slice or stack, such as a carry handle. Similarly in some embodiments, a slice intended only to be used at the bottom of a stack may omit some features such as feet 114, alignment pins, lower electrical connectors, or the like. However, providing features such as recesses 108 and feet 114 for stacking other slices above and below a slice may allow the slice to be used anywhere in a stack, at the top, middle, or bottom of the stack.

In the depicted embodiment, slice 160 is a storage slice which includes a battery internal to the slice (not visible in FIG. 1). Power button 164 is operable to turn display 162 on or off to display information about the battery, such as state of charge information, temperature information, a charge cycle count, or the like. In various embodiments, a system 100 for battery charging and power output may include at least one slice with batteries. In some embodiments, a system 100 for battery charging and power output may be expandable by adding additional batteries to increase storage capacity. For example, a second storage slice similar to slice 160 may be added to the stack. Batteries of one or more storage slices 160 may be charged via power input received by slices 150, 170, and may provide power via DC power outlets 102 or AC power outlets 106 of slice 150.

In the depicted embodiment, slice 170 is a DC input slice, which includes at least one DC power input connection 186 for connecting to a DC power source. In the depicted embodiment, power button 174 is operable to turn display 172 on or off to display information about a DC power source, such as current or past power levels. In various embodiments, the DC power input connections 186 may be various types of connectors for connection and disconnection of DC power sources such as solar panels. In some embodiments, DC power input connections 186 may be keyed, tool-less, weather-resistant connectors for connection to solar arrays. In the depicted embodiment, slice 170 includes two DC power input connections 186. In another embodiment, a DC input slice may include more or fewer DC power input connections 186, or another type of DC power input connection 186 than the connection 186 shown in FIG. 1. A slice with a DC power input connection 186 may also include one or more DC-to-DC power converters for converting a DC voltage at the DC power input connections 186 to another DC voltage, such as a voltage for charging batteries in a storage slice 160.

A DC power source, in various embodiment, may be a solar panel array, a wind turbine, a fuel cell, or the like, and may be coupled to the system via a DC power input connection 186. Similarly, although the depicted embodiment of a system 100 does not include AC power inputs, some embodiments of systems 100 for battery charging and power output may include AC power inputs, with AC-to-DC power converters for charging batteries from AC power sources such as diesel generators, a public power grid, or the like.

In the depicted embodiment, slices 160, 170 include sliding latches 116 operable to connect a slice with a latch 116 to the slice above it. In various embodiments, stacking a first slice on top of a second slice may involve positioning the first slice above a second slice, lowering the first slice onto the second slice so that the alignment features engage (e.g., so that feet 114 of the first slice engage recesses 108 of the second slice), and operating the sliding latch 116 to latch the slices together (e.g., so that bumping or slightly lifting the first slice does not disconnect it from the second slice). Although FIG. 1 does not depict both sides of the slices 160, 170, sliding latches 116 may be provided on both sides. In some embodiments the use of a sliding latch 116 rather than another type of connector allows slices to be easily stacked and unstacked in small spaces where it would be difficult to operate a bulkier connector that moves towards or away from the slice rather than along the slice.

Although the system 100 in the depicted embodiment includes three slices 150, 160, 170, a system 100 of hot-swappable, stackable slices may include more or fewer slices, or a variety of slices. Hot-swappable slices may be added or removed to a system 100 over time to provide flexibility and expandability. For example, a system 100 may initially include a slice 150 with a DC input coupled to a solar array, and a storage slice 160. The battery capacity of the system may be increased simply by adding another storage slice 160. Power generation capacity may be increased by adding a DC input slice 170 and coupling additional solar power arrays to the DC input slice. This modular way of expanding the system 100 allows a user to start small and spread out the costs of a larger system over time.

Additionally, expanding a system by adding slices may allow components that were used with a smaller system to still be used with a larger system. One problem with expanding some systems for battery charging and power output is that components may be permanently installed or non-modular and may not be useful with a larger system. For example, if a system includes an inverter to provide AC power to household appliances from a battery bank, improving the system to be capable of running a high-power appliance such as an electric clothes dryer may involve replacing the old inverter with a new, more powerful inverter. By contrast, in a system 100 of hot-swappable, stackable slices, the system 100 can be expanded to add a dryer outlet (and a sufficiently powerful inverter) merely by adding a slice, while the slice with other AC power outlets 106 and an inverter to power them is still used in the same system 100.

Additionally, in some embodiments, slices in a system 100 of hot-swappable, stackable slices may be decoupled and used individually, or in separate subsystems. For example, a person with a solar array installed at home may keep a DC input slice 170 at home, and may stack a storage slice 160 on the DC input slice 170 to charge the storage slice 160. Meanwhile, the AC output slice 150 and a second storage slice (if charged) may be stacked together in a separate sub-stack, and used to power devices in an "off-grid" location away from home. When the battery in one storage slice is depleted, the user may return home to exchange the storage slices, so that the depleted storage slice is recharged in a stack at home, and the recharged storage slice 160 is used in a stack with the AC output slice 150 in an off-grid location. Slices are described in more detail below with reference to subsequent figures.

Figure 2:
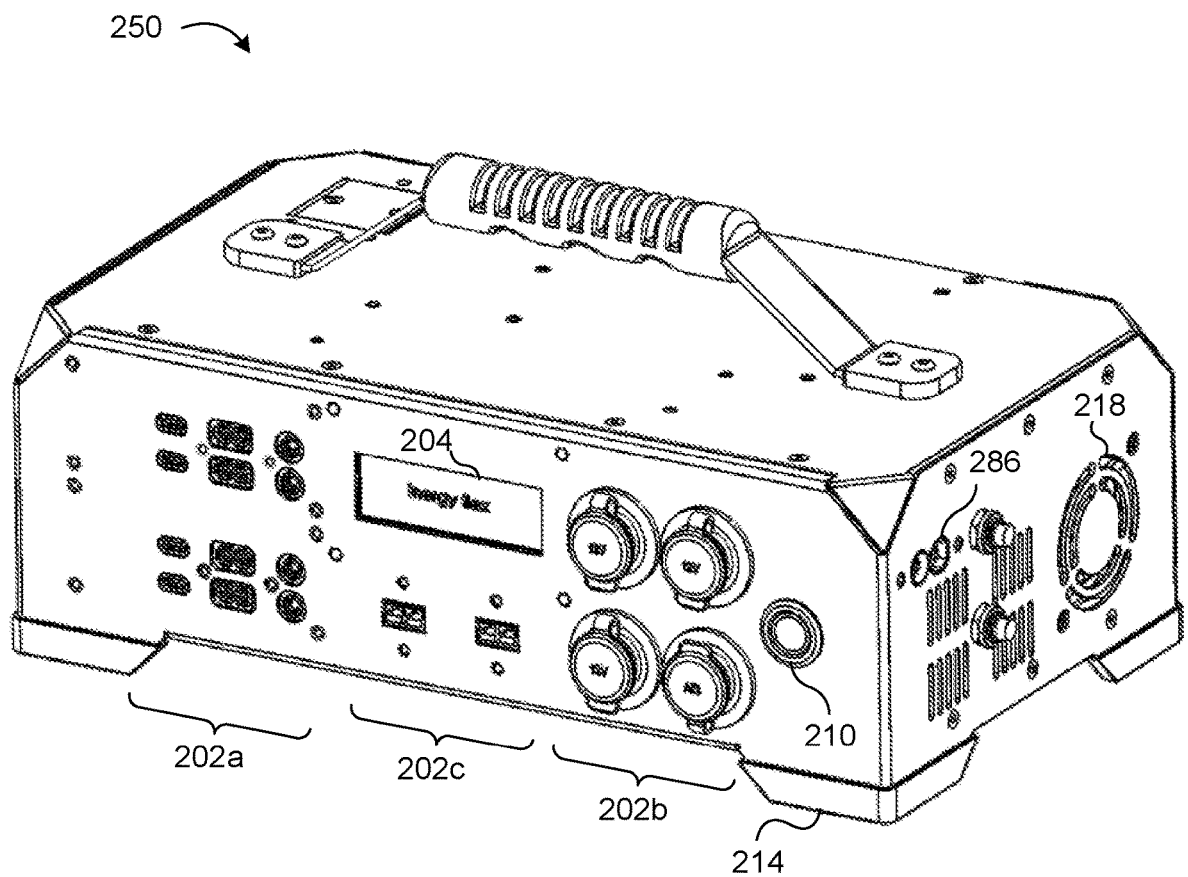
FIG. 2 is a perspective view illustrating one embodiment of a slice.

FIG. 2 depicts a further embodiment of a slice 250, which may be a hot-swappable, stackable slice as described above with reference to FIG. 1. In the depicted embodiment, the slice 250 includes DC power outlets 202, a display 204, a power button 210, feet 214, and DC power input connection 286, which may be substantially as described above with reference to FIG. 1, apart from difference that are described below. The slice 250 may be substantially similar to the slice 150 of FIG. 1, but with additional DC power outlets 202 instead of AC power outlets 106.

DC power outlets 202, in the depicted embodiment, include multiple smaller power outlets 202a, (including USB-C, USB-A, and 5525 barrel plug connectors), multiple larger power outlets 202b (including cigarette lighter sockets), and additional outlets 202c (including POWERPOLE® or compatible connectors). In another embodiment, a DC power output slice 250 may include more, fewer, or a different variety of DC power outlets 202. The power button 210 may control power to the DC power outlets 202 and/or the display 204.

The DC power input connection 286, in the depicted embodiment, is substantially similar to the DC power input connections 186 described above for the slices 150, 170 of FIG. 1, and is coupled to DC-to-DC power conversion circuitry. A fan grill 218 provides ventilation for air cooling by an internal fan.

In various embodiments, mechanical and electrical connections between slices in a system 100 allow the slices to operate together as a system. Mechanical and electrical connectors may be disposed on top and/or bottom surfaces of slices, so that simply stacking the slices (and, possibly, latching them together with a latch) forms the mechanical and electrical connection between the slices.

Figure 3:
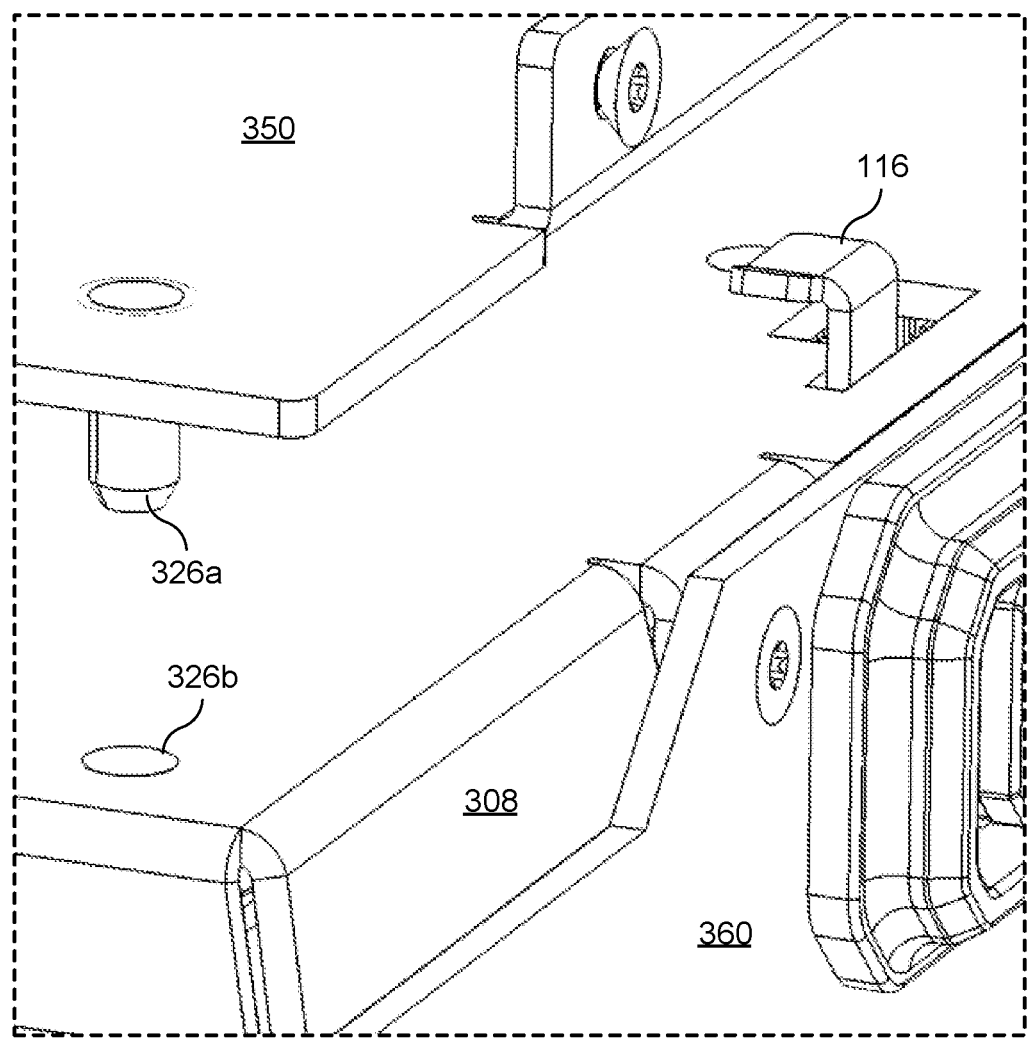
FIG. 3 is a perspective view illustrating details of two slices stacking.

FIG. 3 depicts details of two slices stacking, in one embodiment. A first slice 350 is stacked on a second slice 360. A dashed line indicates that the slices 350, 360 extend beyond the depicted portions of the slices. The second slice 360 includes a recess 308 for receiving feet of the first slice 350. Feet of the first slice are not depicted, however, so that other details discussed below are visible.

In the depicted embodiment, the first slice 350 includes an alignment pin 326a, and the second slice 360 includes a hole 326b for receiving the alignment pin. To mechanically connect the slices, they may be lowered onto each other so that the alignment pin 362a is received by the hole 326b and the feet of the first slice 350 are received by the recess 308. The latch 116 may engage a hole in the bottom of the first slice. Sliding the latch 116 may engage the protruding portion of the latch 116 with the first slice to mechanically couple the slices 350, 360 together. With the slices 350, 360 coupled together by the latch 116, the first slice 350 cannot be lifted off the second slice 360 until the latch 116 is unlatched. Although FIG. 3 depicts details of the mechanical connection between slices 350, 360 on only the right side of the slices, the slices may include a similar alignment pin 326a, holes 326, and latch 116 on the left side. In some embodiments, a latch 116 may include one or more magnet to maintain the latch 116 in the latched position, to prevent accidental partial latching or vibration loosening.

Figure 4:
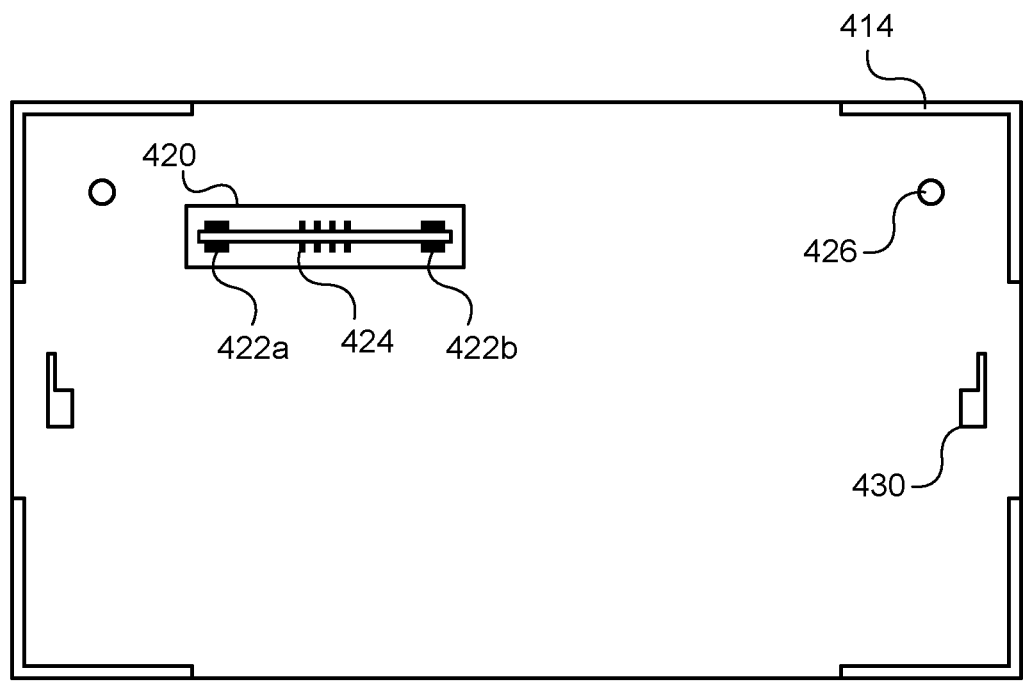
FIG. 4 is a bottom view illustrating one embodiment of a slice.
Figure 5:
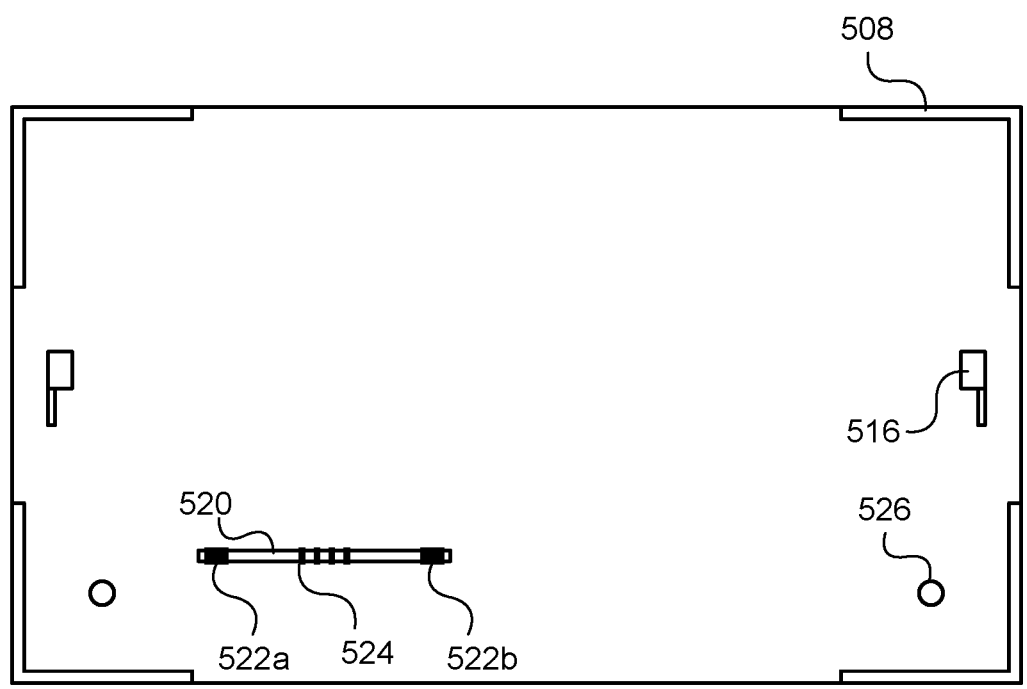
FIG. 5 is a top view illustrating a further embodiment of a slice.

FIGS. 4 and 5 depict the bottom of a first slice (in FIG. 4), and the top of a second slice (in FIG. 5). In general, in various embodiments, a slice may include at least one electrical connector for connecting to a second slice, and at least one mechanical connector for connecting to a second slice. Features on the bottom of the first slice in FIG. 4 are complementary to features on the top of the second slice in FIG. 5, allowing the first slice to be stacked on the second slice to form a mechanical and electrical connection.

In the depicted embodiments, mechanical and electrical connectors are located on upper and lower surfaces of the slices. With mechanical and electrical connectors disposed on a lower surface of a first slice (in FIG. 4), corresponding to mechanical and electrical connectors disposed on an upper surface of a second slice (in FIG. 5), stacking the first slice on the second slice may be sufficient to form an electrical and mechanical connection between the first slice and the second slice.

Electrical connector(s) for a slice, in some embodiments, may include a lower electrical connector 420 located on a lower surface of the slice, and/or an upper electrical connector 520 located on an upper surface of the slice. Although the electrical connectors 420, 520 and the conductors within the connectors 420, 520 are depicted in particular positions in FIGS. 4 and 5, the location of the connectors 420, 520 or of individual conductors in some embodiments may vary from what is depicted. Connectors 420, 520 in other locations on lower and upper surfaces of slices, or conductors in other locations within connectors, may still be in positions that match or correspond to each other, to facilitate making an electrical connection by stacking the slices.

In the depicted embodiment, the upper electrical connector 520 is an edge connector, where conductors are positioned on or near the edge of a printed circuit board ("PCB"), and the lower electrical connector 420 is a matching socket for a PCB edge connector. In another embodiment, other types of matching connectors may be used as upper and lower electrical connectors 420, 520.

An electrical connector 420, 520 for connecting a slice to another slice may include connections for power and communication. In the depicted embodiment, electrical connector 420 includes power connections 422, including a positive rail 422a and a ground rail 422b, and communication connections 424. In the depicted embodiment, a communications bus uses four conductors, and couples to four connections 424. In another embodiment, communications may use more or fewer conductors. Similarly, in the depicted embodiment, electrical connector 520 includes power connections 522, including a positive rail 522a and a ground rail 522b, and communication connections 524.

In some embodiments, coupling slices together in a stack so that the slices share a common positive rail and a positive ground rails allows power to be transmitted between slices to charge batteries in storage slices from input slices, to use batteries in storage slices to power output slices, or the like. In some embodiments, where a slice includes both a lower electrical connector 420, and an upper electrical connector 520, copper bus bars may internally couple the lower positive rail 422a to the upper positive rail 422a, and the lower ground rail 422b to the upper ground rail 522b. Thus, positive rail connections 422a, 522a may be conductors for a positive rail common to a plurality of slices in a system 100. Similarly, ground rail connections 422b, 522b may be conductors for a ground rail common to a plurality of slices in a system 100, and communication connections 424, 524 may be conductors for a communication bus, for communication among the slices.

In some embodiments, a communication bus for communication among the slices may be a host-free or multi-master bus, allowing slices to communicate directly among other slices. In one embodiment, a communication bus may be, or may be based on, a Controller Area Network ("CAN") bus used in vehicles. In another embodiment, a communication bus may be another type of bus using a protocol other than a CAN bus protocol.

Mechanical connectors for connecting a first slice to a second slice, in various embodiments, may include any type of fastener, latch or the like, that forms a mechanical connection to maintain the conductors of electrical connectors 420, 520 in alignment. In some embodiments, electrical and mechanical connectors may be combined into a single connector, such as a latching power connector. In some embodiments, however, mechanical connectors separate from the electric connectors may provide a more secure or rigid connection than various types of electrical connectors provide alone.

In some embodiments, a mechanical connector for stacking a first slice onto a second slice may include one or more alignment features to align the first slice with the second slice, and/or a sliding latch operable to detachably connect the slice to the second slice. As described above, an alignment feature may be a protrusion, a recess that matches a protrusion, or the like. In the depicted embodiment, alignment features at the lower side of the first slice, in FIG. 4, include feet 414 protruding from the lower surface, and alignment pins 426. In the depicted embodiment, alignment features at the upper side of the second slice, in FIG. 5, include recesses 508 to receive the feet 414, and holes 526 to receive the alignment pins 426. When the first slice is stacked on the second slice with the alignment features engaged, latches 516 on the sides of the second slice engage slots 430 in the first slice, and pass through a wide part of the slots 430. The latches 516 (which may be substantially similar to the latch 116 described above) may then be operated by sliding the latch handles so that the protruding part of the latch 516 slides into a narrower part of the slot 430. Thus, operating the latches 516 may detachably secure the first slice to the second slice. The latches 516 may be operated by sliding them in the opposite direction to detach and unstack the slices if needed.

Figure 6:
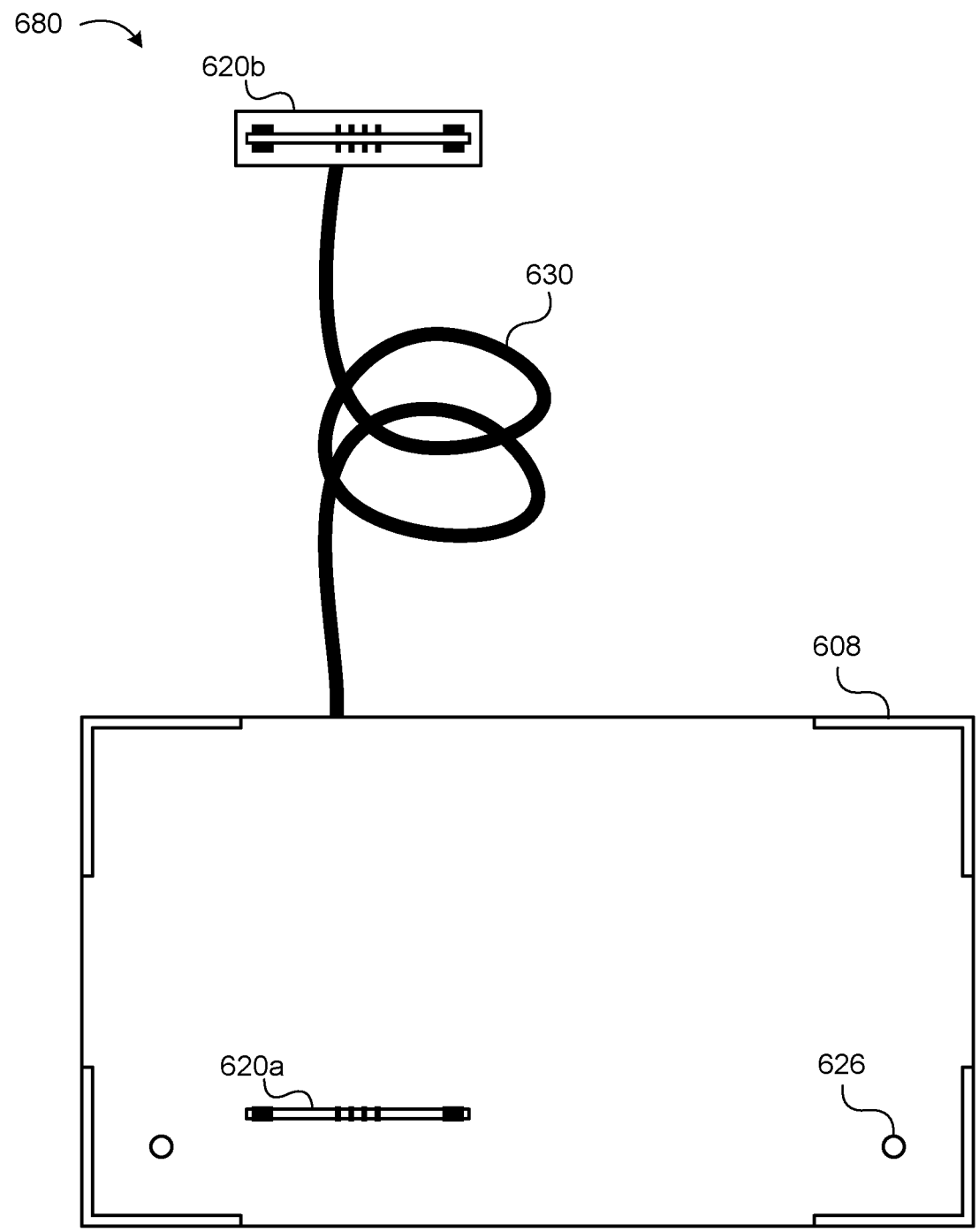
FIG. 6 is a top view illustrating one embodiment of a stack base.

FIG. 6 depicts one embodiment of a stack base 680, in a top view. The stack base 680, in the depicted embodiment, may be substantially similar to the stack base 180 described above with reference to FIG. 1. In some embodiments, a system 100 for battery charging and power output may include a plurality of slices in a free-standing stack, without a base. However, if the number of slices in a system is large, it may be impractical to couple them together in a single stack, due to difficulty reaching the top of the stack, excessive weight on slices at the bottom of the stack, a high center of gravity making the stack more likely to tip if bumped, or the like. Thus, in some embodiments, slices may be stacked four or five units high in separate stacks, and a stack base may be used to couple stacks together.

In the depicted embodiment, the stack base 680 includes a first electrical connector 620a located on an upper surface of the stack base 680, for connecting to a first stack of slices, and a second electrical connector 620b, coupled to the first electrical connector 620a by a cable 630, for connecting to a second stack of slices. In the depicted embodiment, the stack base 680 occupies the same perimeter or footprint as a slice, and includes features for stacking other slices on the stack base 328 and forming a mechanical and electrical connection, including electrical connector 620a, recesses 608 for receiving feet, and holes 626 for receiving alignment pins. A first stack of slices may be built on the stack base, and a second stack of slices may be built near the stack base 680. The second electrical connector 620b may then be coupled to an electrical connector on the top of the second stack of slices. In some embodiments, using one or more stack bases 680 to couple multiple stacks of slices may allow a user to expand a system 100 for battery charging and power output beyond the practical height limits of a single stack.

Although the electrical connector 620a is depicted in a particular position on the stack base 680, the location of the connector 620a in various embodiments may vary from what is depicted in FIG. 6, to correspond to the location of connectors on the lower surface of a slice. Location of conductors within a connector 620a, 620b may similarly be varied in various embodiments.

Figure 7:
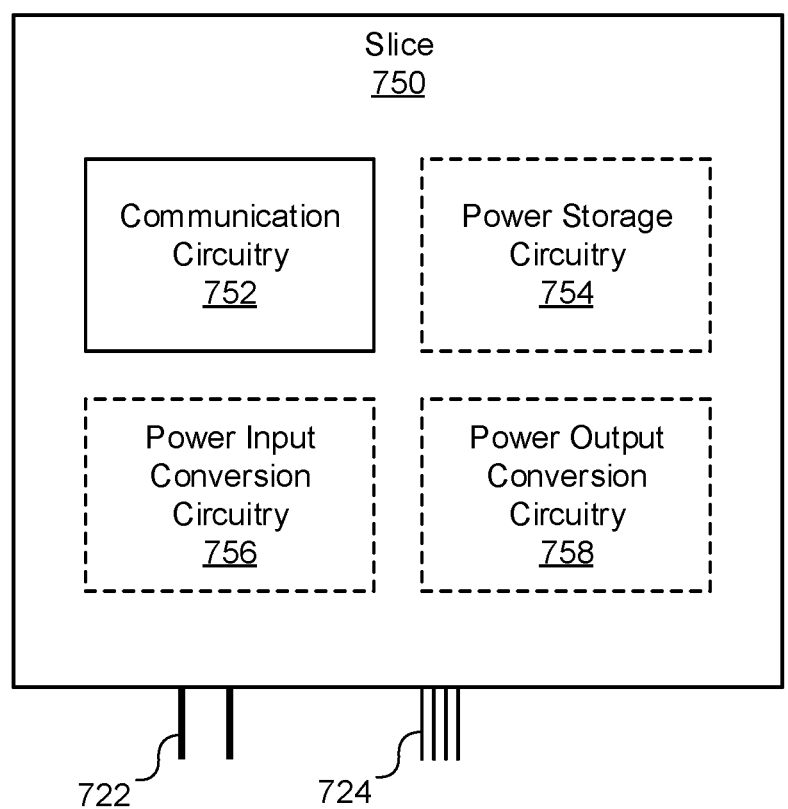
FIG. 7 is a schematic block diagram further illustrating components of a slice, in some embodiments.

FIG. 7 is a schematic block diagram further illustrating components of a slice 750, in some embodiments. FIG. 7 illustrates certain internal components of the slice 750 that are not visible in previous figures, and is representative of many different embodiments of slices. Some components, represented by dashed outlines may be included in some embodiments of slices but omitted other embodiments of slices. Further embodiments that omit or include certain components are described below with reference to FIGS. 9-13. In the depicted embodiment, the slice 750 includes communication circuitry 752, connections 722 for power, and connections for communications 724. In various embodiments, the slice 750 includes power storage circuitry 754, power input conversion circuitry 756, and/or power output conversion circuitry 758.

The communication circuitry 752, power storage circuitry 754, power input conversion circuitry 756, and/or power output conversion circuitry 758 may receive or transmit power via connections 722. The communication circuitry 752 may communicate with other slices via connections 724, and may communicate internally with slice components such as power storage circuitry 754, power input conversion circuitry 756, and/or power output conversion circuitry 758 via internal communications connections, which may be separate from the inter-slice communications bus.

The communication circuitry 752, in the depicted embodiment, is configured to communicate with one or more other slices. The slice 750 may use the communication circuitry 752 to send information to other slices, request information from other slices, receive information from other slices, or the like. For example, the slice 750 may use communication circuitry 752 to request state of charge information from another slice, and receive the state of charge information, and present the state of charge information via a display 204. In another embodiment, a slice 750 may use communication circuitry 752 to receive an information request and transmit the requested information.

Communication circuitry 752 in various embodiments, may include any circuitry or controller for communicating via a communications bus. For example, in some embodiments, where a CAN bus protocol is used for inter-slice communication, the communication circuitry 752 may include a CAN bus controller. In another embodiment, communication circuitry 752 may include another type of controller for another type of bus.

In some embodiments, communication circuitry 752 may be configured to claim or receive a dynamically assigned address for the slice 750, and/or to broadcast an ID that includes the dynamically assigned address for the slice 750 and a slice type for the slice 750. Dynamic address claiming may allow slices 750 to communicate among each other in a hot-swappable system without any particular slice being present to assign addresses. Additionally, broadcasting a slice address and slice type may allow the slices in a system 100 to know what other types of slices are present, to facilitate communicating with and utilizing those slices.

In some embodiments, communication circuitry 752 may be configured to claim a dynamically assigned address for the slice 750 based on a unique identifier for the slice 750, and based on previously assigned addresses for the other slices currently connected to the slice 750. In some embodiments, communication circuitry 752 may use SAE J1939 address claiming, a modified version of SAE J1939 address claiming to support more addresses, or another protocol to claim an address.

Figure 8:
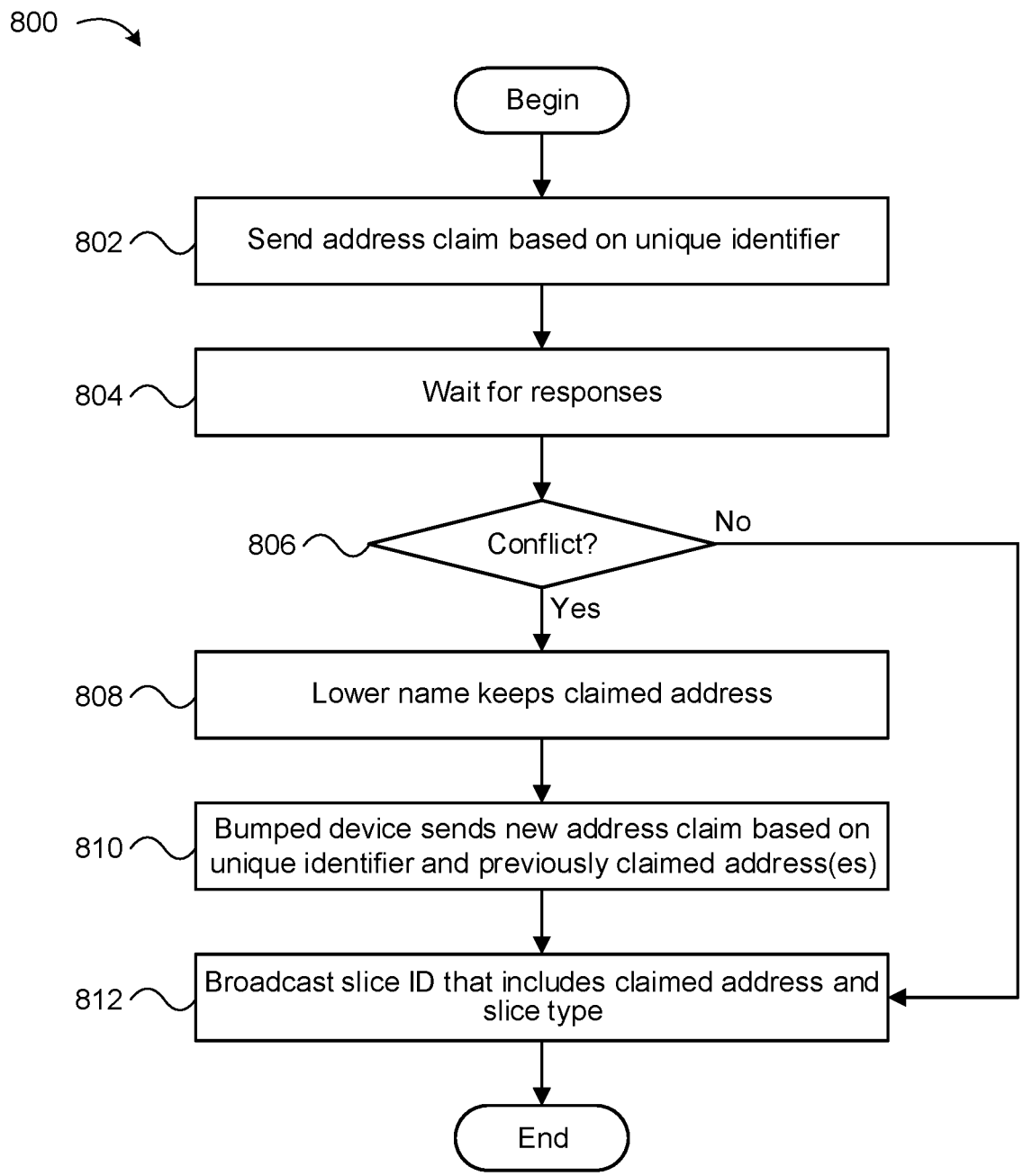
FIG. 8 is a schematic flow chart diagram illustrating one embodiment of a method for dynamic address claiming among slices.

Referring to FIG. 8, a method 800 is depicted for dynamic address claiming among slices. The communication circuitry 752 for a slice 750 may send 802 an address claim over a communication bus. The slice 750 may be pre-programmed with a unique identifier for that slice, so that any two slices have different identifiers. Ensuring that identifiers are unique, however, may make the identifiers longer than addresses used by the communication bus. Thus, the communication circuitry 752 may implement an algorithm for determining an address based on the unique identifier (e.g., by hashing the unique identifier), and may send 802 the address claim message to attempt to claim that address After sending 802 an address claim, the communication circuitry 752 may wait 804 for responses from other slices. In one embodiment, communication circuitry 752 may wait 250 milliseconds for responses. In another embodiment, wait time may be shorter or longer than 250 milliseconds. If another slice is using the claimed address, the other slice may respond to indicate that there is a conflict. The communication circuitry 752 may determine 806, based on the responses if a conflict exists (i.e., if another slice has claimed or is attempting to claim the same address). If no conflict exists, the address is claimed. The slice 750 may broadcast 812 a slice ID on the bus that includes the claimed address and slice type (e.g., whether the slice 750 is a storage slice 160, a head unit 150, a DC input slice 170, or the like).

If a conflict exists, the communication circuitry 752 for the slice negotiates the conflict with the communication circuitry of the other slice in the conflict. In the depicted embodiment, the slice with the lower name (or unique ID) keeps 808 the claimed address (and may broadcast a slice ID including that address). In another embodiment, another resolution rule may determine which slice keeps the claimed address. The "bumped" slice that didn't get the claimed address sends 810 a new address claim, based on the unique identifier for that slice and one or more previously claimed addresses.

For example, communication circuitry 752 may implement a method for generating a sequence of possible addresses from the unique identifier (e.g., by repeated hashing, by incrementing the first claimed address by a predefined step, or the like). If slice 750 is "bumped" and does not receive its claimed address, communication circuitry 752 may send 810 a new address claim, attempting to claim the next address in the sequence that has not already appeared as the address of another slice in the responses from other slices. If a conflict exists again, steps are repeated to resolve the conflict and claim a new address, until slices in a system have non-conflicting addresses.

A slice that has successfully claimed an address may broadcast 812 a slice ID that includes the claimed address and slice type. For example, in one embodiment, using a CAN bus, a message on the bus may include a 29 bit identifier and up to eight data bytes. The identifier may include an eight-bit address claimed by the slice that sends the message, and additional bits of the identifier may be used to convey additional information such as a slice type. Using the identifier to communicate a slice's address and the type of slice avoids using the data bytes sent by a device to describe what the device is.

Referring back to FIG. 7, the slice 750 includes power storage circuitry 754, power input conversion circuitry 756, and/or power output conversion circuitry 758. In general, in various embodiments, a system 100 receives power and converts it to the voltage of a common positive rail via power input conversion circuitry 756, stores energy using power storage circuitry 754 (e.g., including batteries that charge or discharge via the power connections 722), and outputs power by using power output conversion circuitry 758 to convert power from the power connections 722 to a desired output voltage.

Power storage circuitry 754 may include components that store energy, such as batteries. Batteries may include one or more electrochemical cells that produce electrical power from a chemical reaction (or, during recharging, that consume electrical power to reverse the reaction). In various embodiments, power storage circuitry 754 may include additional components to manage batteries, such as battery management systems, battery control modules, components such as thermistors or thermocouples to monitor battery temperature, or the like.

Power input conversion circuitry 756 and/or power output conversion circuitry 758, in various embodiments, may include one or more power converters. In general, in various embodiments, the term "power converter" may refer to any component or set of components that converts electrical power in one form to electrical power of another form. For example, power converters may convert DC power to AC power, convert AC power to DC power, convert an input voltage, current, or frequency (for AC power) to a different output voltage, current, or frequency, or the like.

In some embodiments, power input conversion circuitry 756 and/or power output conversion circuitry 758 may include switched-mode power converters, in which at least one component such as an inductor, a transformer, or a capacitor, is capable of storing energy in a magnetic or electric field and releasing the stored energy via an output current, and where switching at the input and/or the output of the energy-storing component transforms power in one form (e.g., at an input voltage and current point) to power in another form (e.g., with higher voltage and lower current, or with lower voltage and higher current). For example, power converters for DC to DC power conversion may be buck converters, boost converters, buck-boost converters (inverting or four-switch), split-pi converters, Ćuk converters, single-ended primary-inductor converter (SEPIC) converters, transformer-based converters, or the like. Various converter topologies may be suitable in different embodiments, depending on the form of the input power, battery voltages, the form of the output power, or the like.

In the depicted embodiments, power converter(s) for power input conversion circuitry 756 receive power from an external source (e.g., via DC or AC power input connectors), and output power to the power connections 722. Conversely, power converters for power output conversion circuitry 758 receive power from the power connections 722 and output power to an external load (e.g., via DC or AC power outlets). In various embodiments, power converters for power input conversion circuitry 756 and/or power output conversion circuitry 758 may include or be coupled to logic hardware to control the power converters. Logic hardware may be a special-purpose controller or a general-purpose processor executing code, and may control parameters of a power converter such as output voltage, output current, input voltage and current, and the like.

Figure 9:
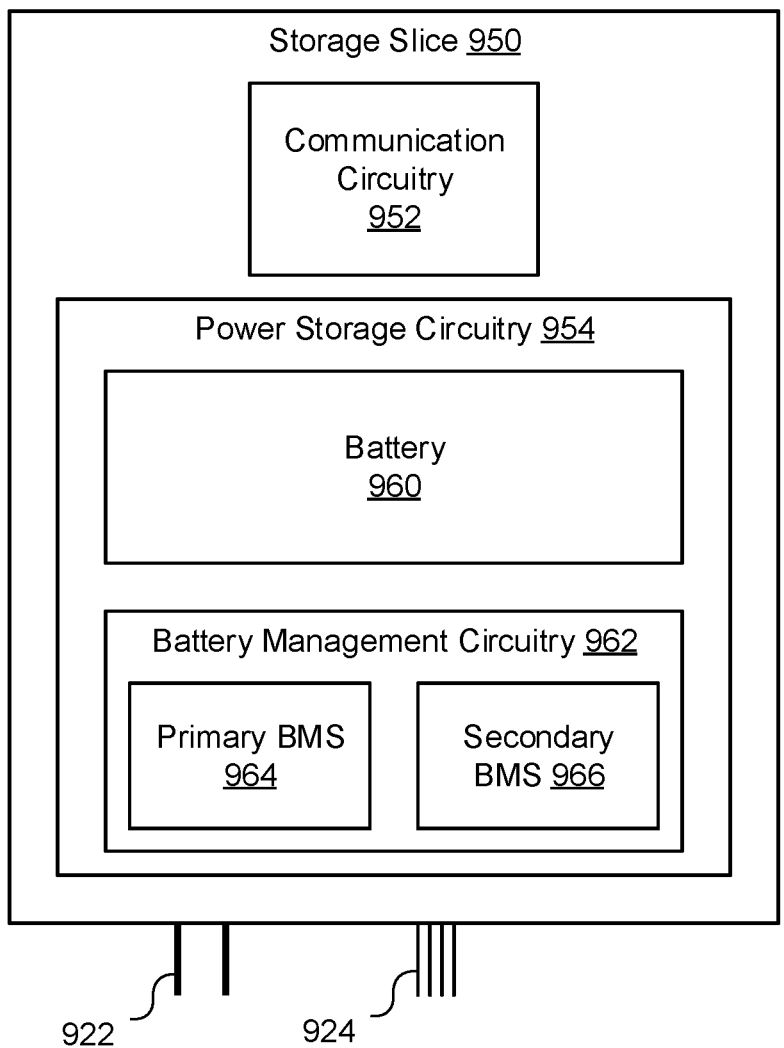
FIG. 9 is a schematic block diagram illustrating one embodiment of a storage slice.

FIGS. 9-13 illustrate further embodiments of slices 950, including different combinations of power storage circuitry 754, power input conversion circuitry 756, and power output conversion circuitry 758. FIG. 9 depicts a storage slice 950, including power connections 922, communication connections 924, communication circuitry 952, and power storage circuitry 954, substantially as described above for other slices apart from differences which are described below. In the depicted embodiment, the power storage circuitry 954 includes a battery 960 and battery management circuitry 962.

A battery 960, in various embodiments, may include an array of battery cells. In some embodiments, cells may be coupled together in series strings to produce a desired output voltage, and the series strings may then be coupled together in parallel for increased current capacity. In some embodiments, cells for a battery 960 may be lithium-ion cells. In another embodiment, cells for a battery 960 may have some other battery chemistry for rechargeable cells. In some embodiments, lithium-ion cells with an output voltage range of 2.7 to 4.2 volts (depending on state of charge) may be coupled together in groups of three cells in series, to provide a range of 8 to 12.6 volts on the power connections 922. In further embodiments, multiple groups or strings of three series cells may be connected in parallel. For example, an 84-cell battery may include 28 parallel groups of three series cells.

Battery management circuitry 962, in various embodiments may include various components for controlling battery charging (e.g., to avoid exceeding a maximum voltage threshold), controlling battery discharging (e.g., to avoid falling under a minimum voltage threshold), monitoring and controlling battery temperature, and the like. Various battery management systems (BMSs) are commercially available for battery management. In the depicted embodiment, the battery management circuitry 962 includes two BMSs 964, 966. The primary BMS 964 may be configured to support high-current charging and discharging (e.g., at up to 250 amperes), but may use a high supply voltage, and may shut off when the battery voltage (and/or the voltage on the power connection 922) is below a threshold. The secondary BMS 966 may be configured to support lower currents (e.g., up to 18 amperes), but may use a lower supply voltage and thus may operate when the battery voltage is below the threshold for the primary BMS 964 to turn off. Providing dual BMSs, in some embodiments, may protect the battery 960 from potentially damaging conditions even when the battery voltage is low.

Figure 10:
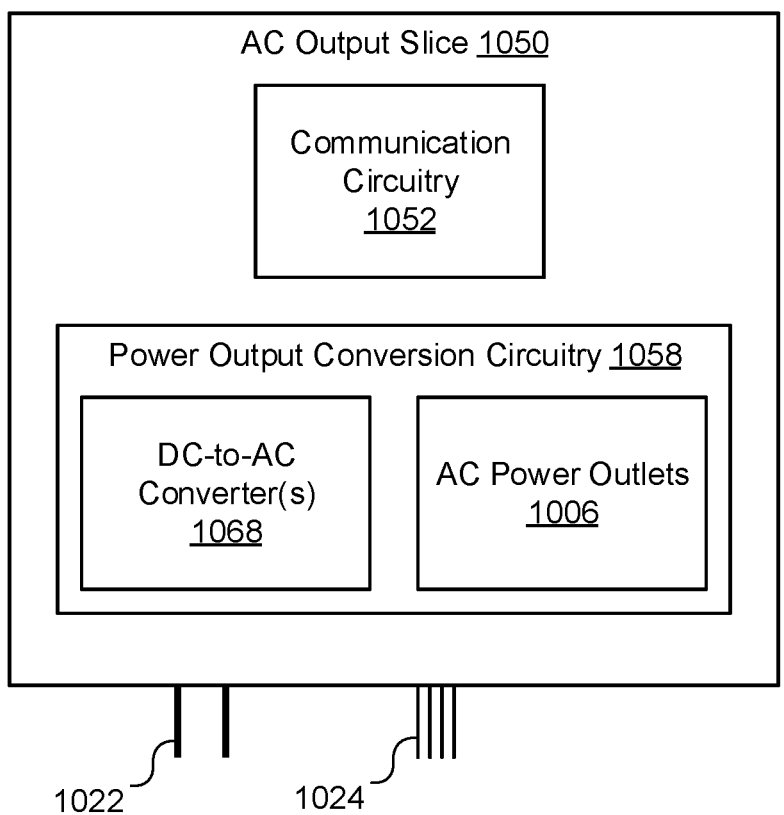
FIG. 10 is a schematic block diagram illustrating one embodiment of an AC output slice.

FIG. 10 depicts an AC output slice 1050, including power connections 1022, communication connections 1024, communication circuitry 1052, and power output conversion circuitry 1058, substantially as described above for other slices apart from differences which are described below. In the depicted embodiment, the power output conversion circuitry 1058 includes one or more DC-to-AC power converters 1068, coupled to a plurality of AC power outlets 1006 (which may be substantially similar to the AC power outlets 106 described above).

DC-to-AC power converters 1068 may receive DC power from power connections 1022, and may output AC power via the AC power outlets 1006. In various embodiments, DC-to-AC power converters 1068 may be power inverters, such as square wave inverters, pure sine wave inverters, modified sine wave inverters, or the like.

In some embodiments, an AC output slice 1050 may primarily convert battery power to AC output. In some embodiments, however, an AC output slice may be a head unit that provides other components for DC input, DC output, or the like. For example, in some embodiments, an AC output slice may include DC-to-DC power converters 1168, coupled to a plurality of DC power outlets 1102 as described below with reference to FIG. 11. In some embodiments, an AC output slice may include DC power input conversion circuitry 1256, as described below with reference to FIG. 12.

Figure 11:
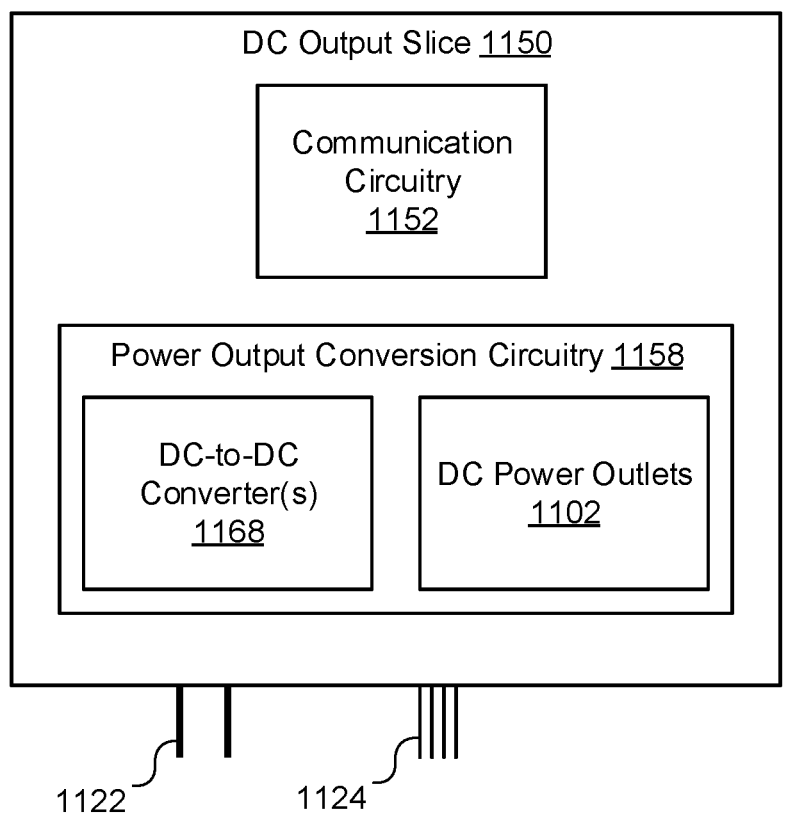
FIG. 11 is a schematic block diagram illustrating one embodiment of a DC output slice.

FIG. 11 depicts a DC output slice 1150, including power connections 1122, communication connections 1124, communication circuitry 1152, and power output conversion circuitry 1158, substantially as described above for other slices apart from differences which are described below. In the depicted embodiment, the power output conversion circuitry 1158 includes one or more DC-to-DC power converters 1168, coupled to a plurality of DC power outlets 1102 (which may be substantially similar to the DC power outlets 102 described above).

DC-to-DC power converters 1168 may receive DC power at one voltage from power connections 1022, and may output DC power at one or more voltages via the DC power outlets 1102. In various embodiments, DC-to-DC power converters 1168 may be boost converters, buck converters, buck-boost converters (inverting or four-switch), split-pi converters, Ćuk converters, single-ended primary-inductor converter (SEPIC) converters, transformer-based converters, or the like In some embodiments, a DC output slice 1150 may primarily convert battery power to DC output. In some embodiments, however, a DC output slice may be a head unit that provides other components for DC input, or the like. For example, in some embodiments, a DC output slice may include DC power input conversion circuitry 1256, as described below with reference to FIG. 12.

Figure 12:
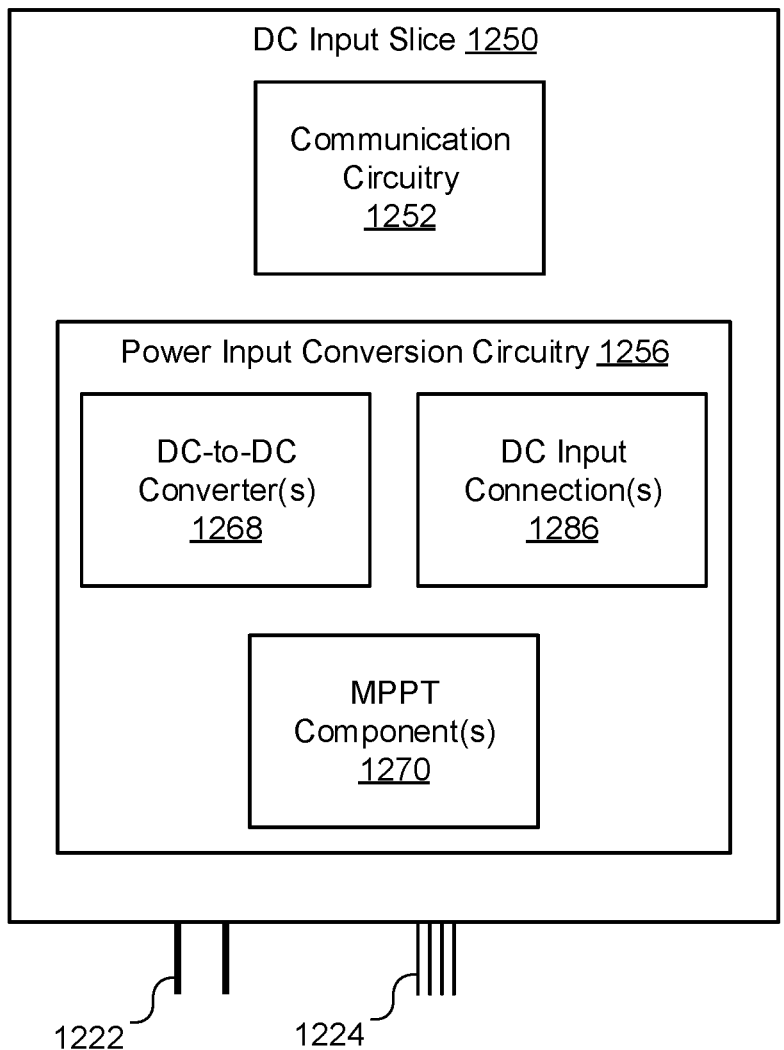
FIG. 12 is a schematic block diagram illustrating one embodiment of a DC input slice.

FIG. 12 depicts a DC input slice 1250, including power connections 1222, communication connections 1224, communication circuitry 1252, and power input conversion circuitry 1256, substantially as described above for other slices apart from differences which are described below. In the depicted embodiment, the power input conversion circuitry 1256 includes at least one DC-to-DC power converter 1268, and at least one DC power input connection 1286 (which may be substantially similar to the DC power input connections 186 described above).

DC-to-DC power converters 1268 may be structurally similar to DC-to-DC power converters 1168 for the DC output slice 1150 of FIG. 11, but may be coupled to the power connections 1222 in the opposite direction, to provide power to the common rails rather than receiving power from the common rails. DC-to-DC power converters 1268 may receive DC power from an external power source such as a solar array, a wind turbine, or the like, via DC input connections 1286.

In some embodiments, one or more DC-to-DC power converter(s) 1268 may be controlled by one or more maximum power point tracking ("MPPT") components 1270, for maximum power point tracking of the solar arrays. MPPT components 1270, in some embodiments, may include logic hardware such as a special-purpose controller or a general-purpose processor executing code. Solar arrays, in various embodiments may output maximum current across a short-circuit or zero-resistance load, and may output maximum voltage across an open-circuit or infinite-resistance load. However, neither the short-circuit nor the open-circuit produce any power, because the voltage across the load is zero in the short-circuit state and the current is zero in the open-circuit state). Drawing less than the maximum short-circuit current from the solar array produces power, and the amount of current drawn determines the available voltage and power. Thus, controlling the current draw of a DC-to-DC power converter coupled to a solar array may control the amount of power produced by the solar array up to a maximum power point (under given lighting conditions). Various methods of maximum power point tracking (MPPT) exist to control current draw from a solar array so that the power output of the solar array is at or near a maximum power point for the available sunlight. Thus, in various embodiments, an MPPT component 1270 may implement a MPPT method by controlling the current draw of a DC-to-DC power converter 1268 from a solar array. Various MPPT methods, known or yet to be discovered, may be implemented by logic hardware of an MPPT component 1270.

In some embodiments, a DC input slice 1250 may include multiple DC input connections 1286, with multiple DC-to-DC power converters 1268 coupled to the DC input connections 1286. In some embodiments, multiple DC-to-DC power converters 1268 may be controlled independently, by multiple MPPT components 1270. For example, two or more separate DC-to-DC power converters 1268 may include or be coupled to two or more separate MPPT components 1270. In some embodiments, providing independent MPPT for different DC power sources may increase power generation capacity. For example, if DC power sources include two solar arrays on opposite sides of a structure such as a house), lighting conditions for the two arrays may differ depending on the time of day. For example, a solar array on an east-facing side of a roof may receive more light in the morning, while a solar array on a west-facing side of a roof may receive more light in the evening. Because each array is under different lighting conditions, the maximum power point for each array may be different, and may be reached at different current levels. Thus, in some embodiments, providing power converters 1268 that implement MPPT independently for different solar arrays may increase production from both arrays compared to controlling both arrays in lockstep as a single unit.

Figure 13:
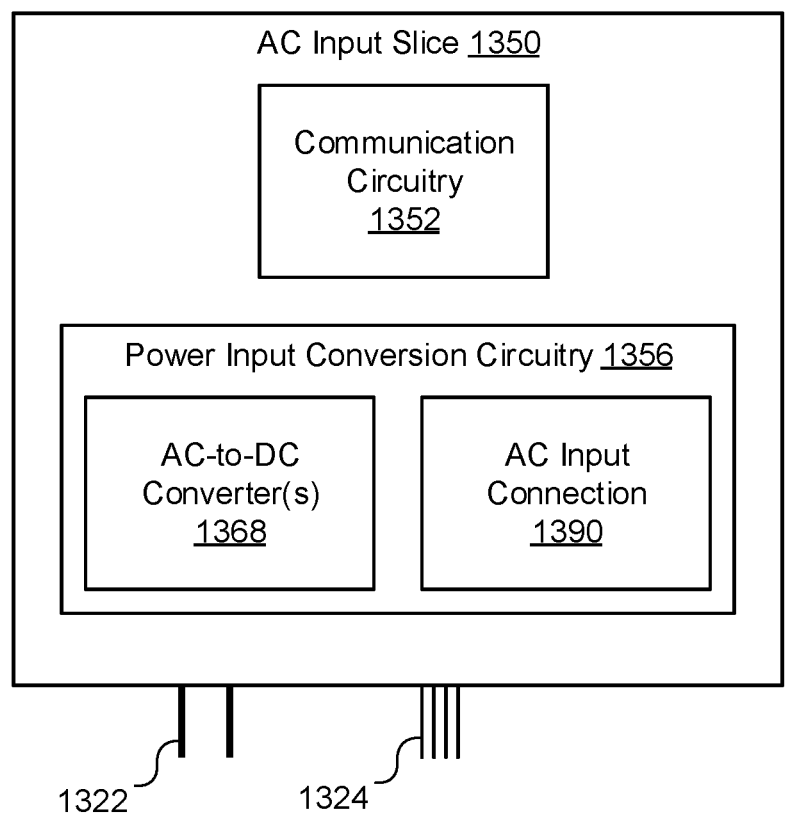
FIG. 13 is a schematic block diagram illustrating one embodiment of an AC input slice.

FIG. 13 depicts an AC input slice 1350, including power connections 1322, communication connections 1324, communication circuitry 1352, and power input conversion circuitry 1356, substantially as described above for other slices apart from differences which are described below. In the depicted embodiment, the power input conversion circuitry 1356 includes at least one AC power input connection 1390, and at least one AC-to-DC power converter 1368.

An AC power input connection 1390 may be a plug or power cord that receives AC power from a source such as a diesel generator, the public power grid, or the like. In some embodiments, an AC power input connection 1390 may be a standard plug such as a NEMA 5-15P plug. An AC-to-DC power converter 1368, in various embodiments, may be a switched mode power supply, a full-wave rectifier coupled to a DC-to-DC power converter, or the like. In some embodiments, an AC input slice 1350 may be useful for rapid charging of one or more storage slices 950 where grid power is available, for subsequent use off-grid.

Figure 14:
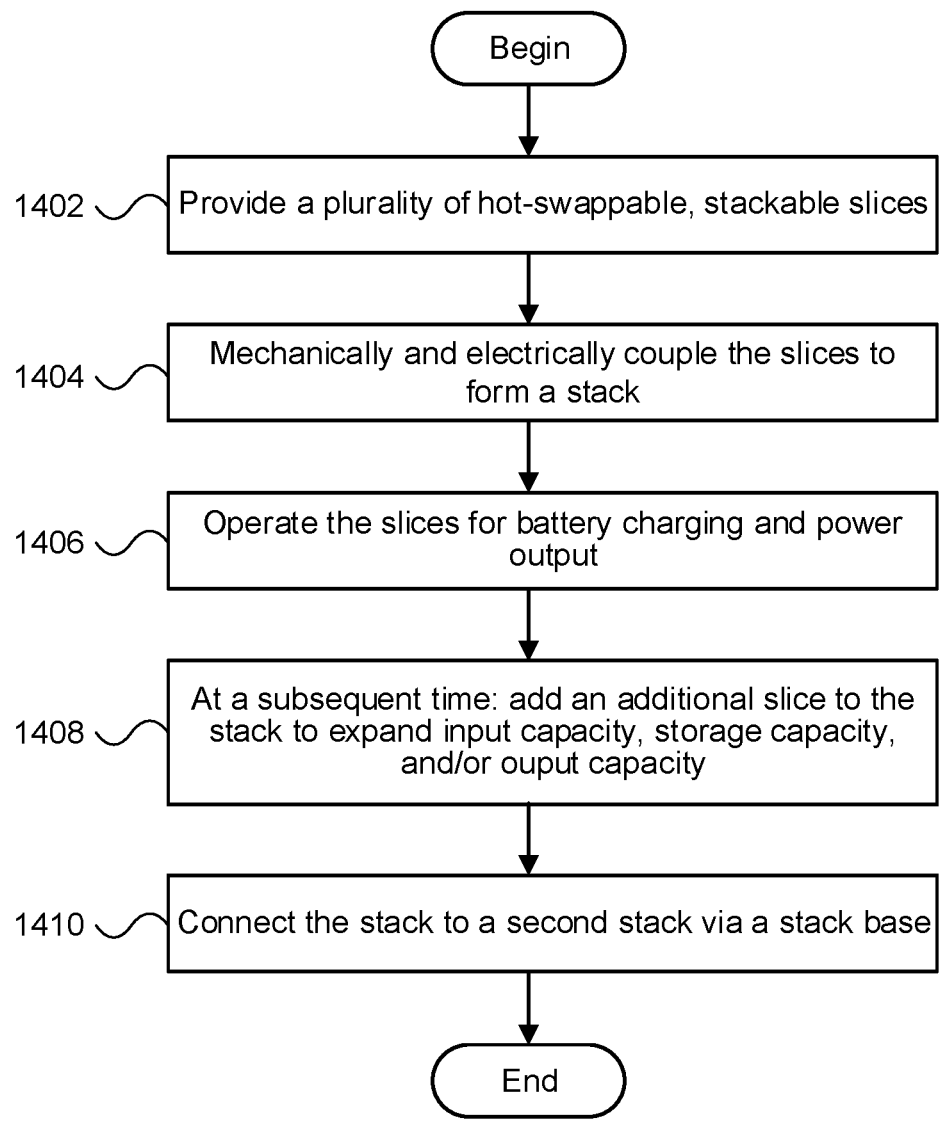
FIG. 14 is a schematic flow chart diagram illustrating one embodiment of a method for battery charging and power output.

FIG. 14 is a schematic flow chart diagram illustrating one embodiment of a method 1400 for battery charging and power output. The method 1400 includes providing 1402 a plurality of hot-swappable, stackable slices for battery charging and power output. A slice may include communication circuitry for communication among the slices; power input conversion circuitry, power storage circuitry, and/or power output conversion circuitry. A slice may include at least one electrical connector for connecting to a second slice, including connections for power and communications; and at least one mechanical connector for connecting to the second slice.

The method 1400 includes mechanically and electrically coupling 1404 the slices to form a stack. The method 1400 includes operating 1406 the slices for battery charging and power output (e.g., by receiving power using input slices to charge batteries in storage slices, then outputting power from the batteries via output slices). The method 1400 includes, at a time subsequent to when the slices are first operated 1406 for battery charging and power output, adding 1408 an additional slice to the stack to expand input capacity, storage capacity, and/or output capacity for the stack.

In some embodiments, a stack may have reached a height at which it becomes impractical to continue adding 1408 additional slices. Such a stack may be further expanded by providing additional slices in a second stack, and connecting 1410 the stack to the second stack via a stack base 680. As with adding 1408 a slice to a stack, connecting 1410 a stack to a second stack via a stack base may expand the input capacity, storage capacity, and/or output capacity for the combined stacks. In some embodiments, however, the step of connecting 1410 a stack to a second stack may be omitted if a single stack provides sufficient input capacity, storage capacity, and output capacity for a user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
a plurality of hot-swappable, stackable slices for battery charging and power output, wherein a slice comprises:
communication circuitry for communication among the slices;
one or more of: power input conversion circuitry, power storage circuitry, and power output conversion circuitry;
at least one electrical connector for connecting to a second slice, the at least one electrical connector comprising connections for power and communications; and
at least one mechanical connector for mechanically connecting the slice to the second slice to secure the slice to the second slice.

2. The system of claim 1, wherein the at least one electrical connector comprises one or more of:
an upper electrical connector located on an upper surface of the slice; and
a lower electrical connector located on a lower surface of the slice.

3. The system of claim 1, wherein the at least one mechanical connector comprises:
one or more alignment features to align the slice with the second slice; and
a sliding latch operable to detachably connect the slice to the second slice.

4. The system of claim 1, wherein the at least one electrical connector and the at least one mechanical connector are disposed on a lower surface of the slice, corresponding to at least one electrical connector and at least one mechanical connector on an upper surface of the second slice, such that stacking the slice on the second slice forms an electrical and mechanical connection between the slice and the second slice.

5. The system of claim 1, wherein the at least one electrical connector includes conductors for:
a positive rail common to the plurality of slices;
a ground rail common to the plurality of slices; and
a communication bus for communication among the slices.

6. The system of claim 1, wherein the communication circuitry is configured to claim a dynamically assigned address for the slice, based on a unique identifier for the slice and previously assigned addresses for the plurality of slices.

7. The system of claim 1, wherein the communication circuitry is configured to broadcast an ID for the slice that includes a dynamically assigned address for the slice and a slice type for the slice.

8. The system of claim 1, wherein one of the slices is a storage slice comprising a battery and battery management circuitry.

9. The system of claim 8, wherein the battery management circuitry comprises a primary battery management system that shuts off when a battery voltage is below a threshold, and a secondary battery management system that operates when the battery voltage is below the threshold.

10. The system of claim 1, wherein one of the slices is an AC output slice, comprising DC-to-AC power output conversion circuitry and a plurality of AC power outlets.

11. The system of claim 1, wherein one of the slices is a DC output slice, comprising DC-to-DC power output conversion circuitry and a plurality of DC power outlets.

12. The system of claim 1, wherein one of the slices is a DC input slice, comprising at least one DC power input connection for connecting to a DC power source, and DC-to-DC power input conversion circuitry.

13. The system of claim 12, wherein the DC input slice comprises a plurality of DC power input connections, and the DC-to-DC power input conversion circuitry comprises a plurality of DC-to-DC power converters coupled to the DC power input connections.

14. The system of claim 1, wherein one of the slices is an AC input slice, comprising at least one AC power input connection, and AC-to-DC power input conversion circuitry.

15. The system of claim 1, wherein one of the slices includes a display for presenting information to a user about the plurality of slices.

16. The system of claim 1, further comprising a stack base, the stack base comprising a first electrical connector located on an upper surface of the stack base for connecting to a first stack of slices, and a second electrical connector coupled to the first electrical connector by a cable, for connecting to a second stack of slices.

17. An apparatus comprising:
a hot-swappable, stackable slice for battery charging and power output, the slice comprising:
   communication circuitry for communication with one or more other slices;
   one or more of: power input conversion circuitry, power storage circuitry, and power output conversion circuitry;
   at least one electrical connector for connecting to a second slice, the at least one electrical connector comprising connections for power and communications; and
   at least one mechanical connector for mechanically connecting the slice to the second slice to secure the slice to the second slice.

18. The apparatus of claim 17, wherein the at least one electrical connector comprises one or more of:
   an upper electrical connector located on an upper surface of the slice; and
   a lower electrical connector located on a lower surface of the slice.

19. The apparatus of claim 17, wherein the at least one mechanical connector comprises:
   one or more alignment features to align the slice with the second slice; and
   a sliding latch operable to detachably connect the slice to the second slice.

20. A method comprising:
providing a plurality of hot-swappable, stackable slices for battery charging and power output, wherein a slice comprises:
   communication circuitry for communication among the slices;
   one or more of: power input conversion circuitry, power storage circuitry, and power output conversion circuitry;
   at least one electrical connector for connecting to a second slice, the at least one electrical connector comprising connections for power and communications; and
   at least one mechanical connector for mechanically connecting the slice to the second slice to secure the slice to the second slice;
mechanically and electrically coupling the slices to form a stack;
operating the slices for battery charging and power output; and
at a subsequent time, adding an additional slice to the stack to expand one or more of input capacity, storage capacity, and output capacity for the stack.

* * * * *